P. WEST.
Rivets for Boots and Shoes.
No. 135,051.   Patented Jan. 21, 1873.
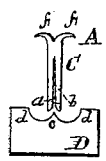
Fig 1.
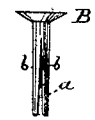
Fig 2.
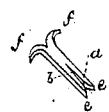
Fig 3.
Fig 4.
Fig 5.
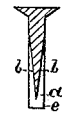
Fig 6.
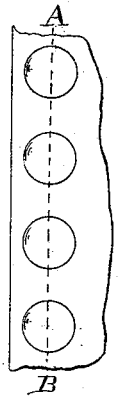
Fig 7.
Fig 10.
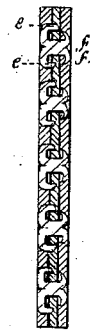
Fig 8.
Fig 9.
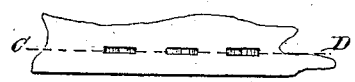
WITNESSES:
E. E. Moore
Thos. H. Dodge
INVENTOR:
Presbury West

UNITED STATES PATENT OFFICE.

PRESBURY WEST, OF WORCESTER, MASSACHUSETTS.

IMPROVEMENT IN RIVETS FOR BOOTS AND SHOES.

Specification forming part of Letters Patent No. 135,051, dated January 21, 1873.

*To all whom it may concern:*

Be it known that I, PRESBURY WEST, of the city and county of Worcester and Commonwealth of Massachusetts, have invented certain new and useful Improvements in Boot and Shoe Rivets to be used in securing the soles to boots and shoes and for forming the seams in boots and shoes; and I do hereby declare that the following is a full, clear, and exact description of the same, reference being had to the accompanying drawing which forms a part of this specification, and in which—

Figure 1 represents a side view of said rivet and the clinching-block used in connection therewith. Fig. 2 represents a side view of a modified form of the rivet. Figs. 3 and 4 represent perspective views of the rivets shown in Figs. 1 and 2. Figs. 5 and 6 represent vertical central sections of the rivets on lines A B and C D, Figs. 1 and 2. Fig. 7 represents a side view of two pieces of leather united by the form of rivets shown in Fig. 2. Fig. 8 represents a section on the line A B, Fig. 7. Fig. 9 represents a plan view of a section of three pieces of leather united by the form of rivets shown in Fig. 1; and Fig. 10 represents a central section on line C D, Fig. 9, of three pieces of leather united by the form of rivets shown in Fig. 1.

To enable those skilled in the art to which my invention belongs to make and use the same, I will describe it in detail.

The head A of the rivet I prefer to make in the form shown in Fig. 1; but it may be made in the form shown at B, Fig. 2. The shank C of the rivet I prefer to make in the form shown in Fig. 1; but that, too, may be made in the form shown in Fig. 2. The points of the shank C are notched or cut out, as shown at $a$, while their sides are creased, as shown at $b\ b$.

In inserting or driving the rivets, the driving head or hammer must be made to correspond to the form of the head of the rivet— that is, if the head is of the form shown in Fig. 1—then the face of the hammer or driving head should be made in the form of the riveting-block D, while, if of the form shown in Fig. 2, the face of the hammer or driving head should be plain.

The operation is as follows: If a sole is to be fastened to the upper, a last having the outer edge of its bottom made or provided with a series of points, $c$, and curves $d$ is used, whereby, when the rivets are driven in, their points $e\ e$ will be turned out and up into the inner sole, as shown in Figs. 8 and 10. If the heads are made in the form shown in Fig. 1, then their points $f\ f$ are forced down into the outer sole, as shown in Fig. 10. By having the points of the rivet notched the points are bent out and up readily when the rivet is driven, since it requires considerable force to split the rivet above the notch. Then, again, by the use of the creaser, the rivet splits comparatively true and even, and the seam or line of separation is not liable to run out at one side. One crease may be made to answer in some qualities of metal; but I prefer to make the shanks with two, the same as shown in the drawing.

It may be remarked that for applying the rivets, either in fastening the soles to boots and shoes or in seaming the uppers, different mechanism may be employed, and in the former case a horn may be employed of the desired formation in lieu of a last.

The notch $a$ extends but a short distance in comparison with the length of the rivet, and the rivet-stem is not, therefore, liable to spread when being driven through the material, to which liability it is subject when the stem is split in two for nearly its whole length. The thin piece of metal between the creases $b$ keeps the stem, in effect, whole until the points are driven down on the last, when the stem splits above the last and for the length of the creases.

By forming the rivet-head of the points $e\ e$ the latter are caused to enter the material like the points on the other end of the rivet.

Having described my improved rivet for fastening the seams and soles to boots and shoes, what I claim therein as new and of my invention, and desire to secure by Letters Patent, is—

1. A boot or shoe rivet having its point notched and its sides creased, substantially as and for the purpose set forth.

2. A boot or shoe rivet, for fastening the soles to the uppers and for forming upper seams, having its head made with curved points $f\ f$, and with its point with points $e\ e$, and its sides creased, substantially as shown in Figs. 1 and 3 of the accompanying drawing.

PRESBURY WEST.

Witnesses:
E. E. MOORE,
THOS. H. DODGE.